O. LAUGHLIN.
FILTER.
APPLICATION FILED FEB. 26, 1912.
1,033,329.
Patented July 23, 1912.
2 SHEETS—SHEET 2.
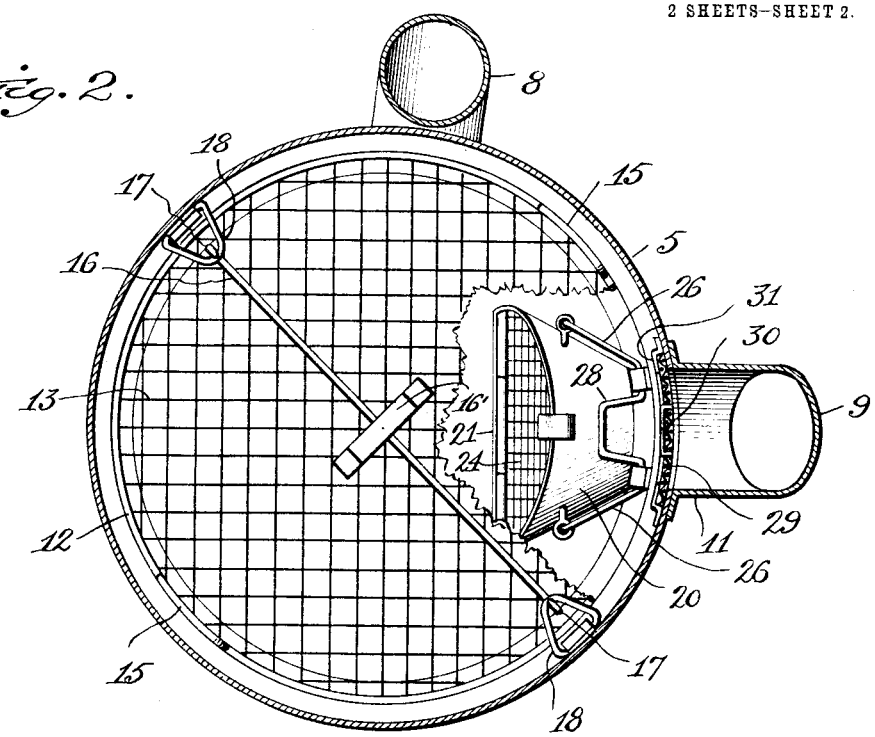
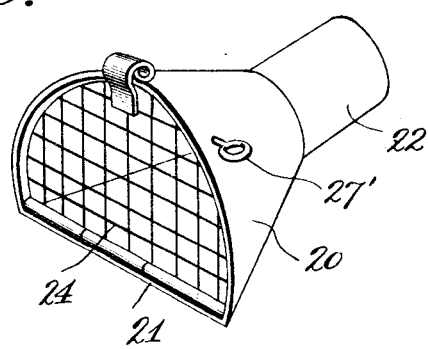

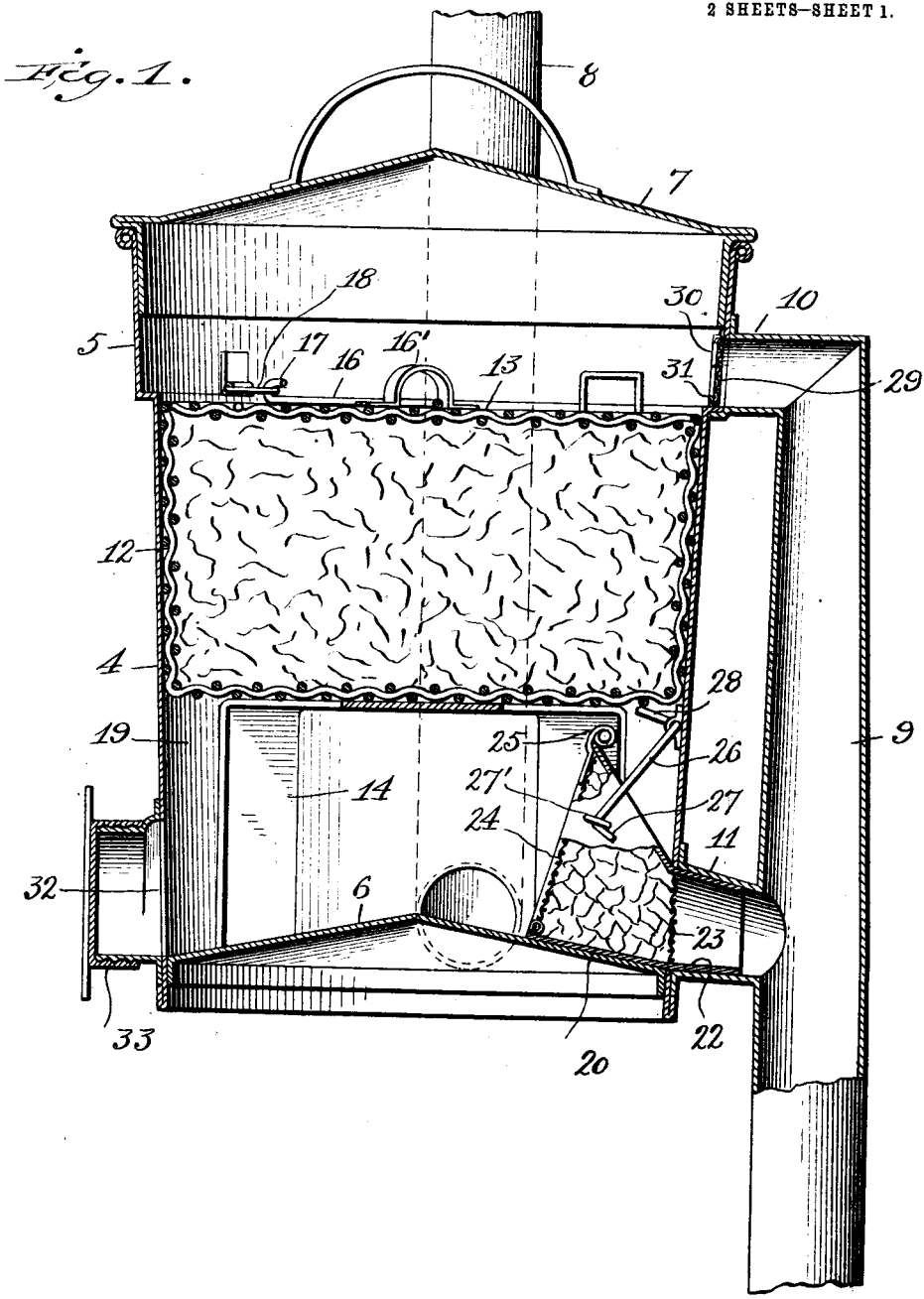

UNITED STATES PATENT OFFICE.

OWEN LAUGHLIN, OF MOUNT STERLING, KENTUCKY.

FILTER.

1,033,329.   Specification of Letters Patent.   Patented July 23, 1912.

Application filed February 26, 1912. Serial No. 679,868.

*To all whom it may concern:*

Be it known that I, OWEN LAUGHLIN, a citizen of the United States, residing at Mount Sterling, in the county of Montgomery and State of Kentucky, have invented certain new and useful Improvements in Filters, of which the following is a specification.

This invention relates to improvements in filters, especially of that class adapted for use in connection with cisterns, and has for its particular object, to provide such a device that is simple in construction, inexpensive to manufacture, and complete in its entirety.

Another object is to provide a filter that will drain itself and at the same time filter the drainings.

With the above and other objects in view, the present invention consists in the combination and arrangements of the parts as will be more fully described hereinafter, shown in the accompanying drawings, and particularly pointed out in the appended claims, it being understood that changes in the form, proportion, size and minor details may be made within the scope of the claims without departing from the spirit or sacrificing any of the advantages of the invention.

In the accompanying drawings: Figure 1 is a vertical sectional view through the device. Fig. 2 is a horizontal sectional view taken above the upper filtering receptacle, part of the same being broken away to show the lower filtering receptacle. Fig. 3 is a detailed perspective view of one of the removable filtering chambers.

Similar reference numerals in all of the figures of the drawings designate like parts.

Referring to the drawings, 4 designates the body or outer casing, which may be of any suitable form and material. As shown said case is somewhat conical, is provided at its upper end with an enlarged portion 5, a conical bottom 6, and a removable cover 7. An inlet pipe 8 connects with the lower end of said casing and is extended upward from said connection and is adapted to be coupled to a supply pipe which may be the downspout of a building. An outlet pipe 9 is connected to said casing at two points by extensions 10 and 11, one connection being adjacent the top of said casing and the other near the bottom. Intermediate the two outlet connections is positioned a removable filtering receptacle comprising preferably a wire basket 12, preferably of coarse mesh, having a removable wire mesh cover 13. Said basket is filled with suitable filtering material, such as charcoal, coke or gravel and the same is confined therein by the cover 13. The said basket 12 preferably fits snugly the sides of the outer casing below the enlarged portion 5, is supported therein by a removable stand 14, the legs of which rest upon the bottom 6, is provided with side handles 15 at its upper edge, and is locked in position by a cross-bar 16, which passes through the handle 16' of the cover 13, and having hooks 17 at its ends which are engaged by the pivoted loops 18 secured to the casing. This locking means not only locks the filtering receptacle in position but also locks the cover 13 in place upon the filtering material within said receptacle.

In the chamber 19 formed beneath the filtering receptacle just described, is located an additional filtering receptacle 20, the same being preferably frusto-conical in shape, having a flat bottom side 21, and a tubular extension 22, forming a receptacle having a wide mouth and sides sloping to the extension 22. Said receptacle is provided with a permanently fixed perforated diaphragm 23 at the intersection of the extension 22 and the receptacle proper, and a hinged perforated or mesh cover 24, of a finer mesh than of the basket 12, at its mouth, between which and the diaphragm is confined suitable filtering material. The hinged cover 24 is provided with a catch 25 to retain it in a closed position. To prevent said receptacle 20 from being displaced and to hold it securely in position, a locking means is provided, the same comprising a pivoted frame having side arms 26, the ends of which are formed into hooks 27, which engage eyelets 27' on the receptacle 20, and a central extension 28 adapted to be contacted by the bottom of the basket receptacle to force the arms 26 toward the side of the casing and thus press the extension 22 within the extension 11 of the outlet pipe. Thus it will be seen that when the filtering receptacles are in position, the basket filter effectually locks the outlet filter in position, and as said basket filter is locked in its position, and the filtering materials locked in both receptacles, the device can be moved bodily, fully charged for operation, without the danger of disturbing or disarranging its contents.

The opening to the extension 10 of the outlet pipe 9 is provided with a screen 29, the same having a handle 30 and supported in guideways 31, whereby it can be removed when desired. This screen is preferably of a smaller mesh than that used for the filtering receptacles and is to prevent any fibrous material that may be accidentally in the upper portion of the filter, from passing into the outlet pipe.

By forming the bottom 6 conical, or sloping from the center, all sediment will gradually work itself toward the lower or outer edge thereof, and can be drawn through the cleansing opening 32, which is fitted with a removable cap or cover 33.

In operation, the water from the inlet pipe flows into the lower chamber 19, flooding said chamber, and passes through both filtering receptacles and into the outlet pipe 9 by way of both extensions 10 and 11, and as the sediment and trash admitted with the water gradually throttles the lower filter, the greatest amount of water naturally is forced upward through the upper and larger filtering receptacle. After the supply is lessened or stopped, the water remaining in the casing is gradually drained through the lower filter leaving only the sediment and trash to be removed.

When it is desired to cool the water passing through the filter, ice can be placed within the casing.

It is obvious that both filtering receptacles can be removed for cleaning, or the device can be flushed by opening the clean-out, removing the cover 7, and pouring water in the top of the casing.

It will be observed, the water is strained before reaching the filtering material, the lower filter will drain itself, its bottom being inclined, and that there are no permanently secured pipes within the casing, thus facilitating the cleaning of the device.

Having thus fully described the invention, what is claimed is:

1. A filter, comprising a casing, an inlet pipe connected to the lower end of said casing, an outlet pipe having two extensions connected to said casing, and two removable filtering receptacles positioned within said casing between said extensions, one of said filtering receptacles being adapted to be seated in one of said extensions, and a locking means for retaining said receptacle in said extension, embodying a pivoted frame having side arms with terminal hooks and a central extension adapted to be engaged by the other receptacle.

2. A filter comprising a casing, an inlet pipe connected to the lower end of said casing, an outlet pipe having two extensions connected to said casing, and two removable filtering receptacles positioned within said casing between said extensions, one of said filtering receptacles being adapted to be seated in one of said extensions, and a locking means for retaining said receptacle in said extension and adapted to be engaged by the other receptacle.

3. A filter, comprising a casing, an inlet pipe connected to the lower end of said casing, an outlet pipe having two extensions connected to said casing, a removable receptacle for containing filtering material for one of said extensions, a second removable receptacle for containing filtering material having a removable cover, positioned between the two extensions, a removable stand for supporting said second receptacle, and a fastening means for locking said cover and second receptacle in position.

In testimony whereof I affix my signature in presence of two witnesses.

OWEN LAUGHLIN.

Witnesses:
W. F. CROOKS,
H. R. FRENCH.

---

Copies of this patent may be obtained for five cents each, by addressing the "Commissioner of Patents. Washington, D. C."